(12) United States Patent
Smadja et al.

(10) Patent No.: US 8,307,413 B2
(45) Date of Patent: Nov. 6, 2012

(54) PERSONAL TOKEN AND A METHOD FOR CONTROLLED AUTHENTICATION

(75) Inventors: Philippe Smadja, Meudon (FR); Jean-Daniel Aussel, Meudon (FR)

(73) Assignee: Gemalto SA, Meudon (FR)

( * ) Notice: Subject to any disclaimer, the term of this patent is extended or adjusted under 35 U.S.C. 154(b) by 654 days.

(21) Appl. No.: 11/574,125

(22) PCT Filed: Aug. 24, 2005

(86) PCT No.: PCT/IB2005/002510
§ 371 (c)(1),
(2), (4) Date: Oct. 1, 2007

(87) PCT Pub. No.: WO2006/021865
PCT Pub. Date: Mar. 2, 2006

(65) Prior Publication Data
US 2008/0263649 A1    Oct. 23, 2008

(30) Foreign Application Priority Data

Aug. 24, 2004   (EP) ...................................... 04292086

(51) Int. Cl.
*H04L 29/06* (2006.01)
(52) U.S. Cl. .............................. 726/9; 713/172; 713/173
(58) Field of Classification Search ........... 713/168–175
See application file for complete search history.

(56) References Cited

U.S. PATENT DOCUMENTS

| | | | |
|---|---|---|---|
| 5,784,463 A * | 7/1998 | Chen et al. .................... | 713/171 |
| 5,892,902 A * | 4/1999 | Clark ............................. | 726/5 |
| 6,438,550 B1 | 8/2002 | Doyle et al. | |
| 7,200,674 B2 * | 4/2007 | Sapuram et al. .............. | 709/238 |
| 2002/0138549 A1 * | 9/2002 | Urien ............................ | 709/202 |
| 2003/0149781 A1 | 8/2003 | Yared et al. | |
| 2003/0177387 A1 * | 9/2003 | Osterwalder et al. ......... | 713/201 |
| 2004/0139319 A1 * | 7/2004 | Favazza et al. ............... | 713/168 |
| 2004/0143559 A1 | 7/2004 | Ayala | |
| 2004/0268152 A1 * | 12/2004 | Xia et al. ...................... | 713/201 |
| 2005/0071282 A1 | 3/2005 | Lu et al. | |
| 2005/0091171 A1 | 4/2005 | Grobman | |
| 2005/0149718 A1 * | 7/2005 | Berlin ........................... | 713/151 |
| 2007/0050845 A1 | 3/2007 | Das et al. | |
| 2007/0156592 A1 | 7/2007 | Henderson | |

FOREIGN PATENT DOCUMENTS

EP    WO2006021865 A1    3/2006

(Continued)

OTHER PUBLICATIONS

Oasis, Assertions and Protocol for the Oasis Security Assertion Markup Language SAML v1.1, Sep. 2003.*

(Continued)

*Primary Examiner* — Edan Orgad
*Assistant Examiner* — Brian Olion
(74) *Attorney, Agent, or Firm* — The Jansson Firm; Pehr B. Jansson

(57) ABSTRACT

The invention relates to a personal token (10) for authentication in a network comprising a piece of software for initiating an SSL connection by generating a message authenticating said token to a remote server (30) characterized in that the piece of software controls the processing of the message so as to use of a data (12) which is prestored in the token (10) and which is specifically associated with the remote server (30) so that the message can be interpreted only by the specific remote server (30).

4 Claims, 2 Drawing Sheets

FOREIGN PATENT DOCUMENTS

| | | | |
|---|---|---|---|
| JP | 2003157235 A | 5/2003 | |
| JP | 2004015665 A | 1/2004 | |
| JP | 2004118377 A | 4/2004 | |
| WO | WO2005064889 A | 7/2005 | |

OTHER PUBLICATIONS

Bhatt, D. V. et al.: "Secure internaet access to gateway using secure socket layer" Virtual Environments, Human-Computer Interfaces and Measurement Systems. VECIMS '03. IEEE International Symposium on Jul. 27, 2003 Piscataway, NJ, USA, p. 157-162, XP010654972, ISBN: 0-7803-7785-0 whole doc.

PCT/IB2005/002510 International Search Report Jan. 10, 2006 European Patent Office, P.B. 5818 Patentlaan2 NL-2280HV Rijswijk.

PCT/IB2005/002510 Written Opinion of the International Searching Authority Jan. 10, 2006 European Patent Office D-80298 Munich.

Von Ahn, et al, "Captcha: Using Hard AI Problems for Security", LNCS, Proceedings of Eurocrypt 2003, vol. 2656/2003, Feb. 19, 2004, pp. 294-311, XP009091663, Berlin, The whole document.

* cited by examiner

PERSONAL TOKEN AND A METHOD FOR CONTROLLED AUTHENTICATION

BACKGROUND OF THE INVENTION

1. Field of the Invention

The invention relates to security on public networks such as the Internet and more generally on any network when using personal tokens such as smart cards for authentication of users.

Many protocols have been proposed for authenticating a user holding a smart card in a network.

2. Description of the Related Art

Current SSL (Secure Sockets Layer) strong authentication is based on smartcard and certificates and is routinely used for authentication, without need for contacting a certificate authority that signed the certificate of the smart card.

One problem however arises in such scheme because of such unneeded contact with a certificate authority.

Indeed the smart card issuer appears to be never asked for consent before a service provider performs authentication of the smart card. In other words, the authentication process by way of a smart card is a benefit to any service provider, including any service provider who has no commercial agreement with the smart card issuer. A smart card therefore becomes a commonly benefiting authenticating tool for any entity, including competitors of the smart card issuer.

It is the case with standard SSL using Public Key Infrastructure (PKI) cryptography. Any server can request the client to authenticate itself using smart card PKI, while the smart card contains a private key and the associated certificate and any server can receive the user certificate and thereby check the validity of the user signature.

SUMMARY OF THE INVENTION

An aim of the invention is to allow smart card issuers to control each authentication made on their smart cards, while still relying on the standard SSL arrangements which are currently available in software and hardware on most servers.

This aim is achieved by way of a personal token, typically a smart card, as recited in the appended claims. An assembly comprising such token and an authentication method are also recited in the claims which both target the same principal aim.

BRIEF DESCRIPTION OF THE DRAWINGS

Other advantages, aims and features related to the invention will be discussed throughout the following detailed description, which is made with referenced to the appended figures, among which.

Figure 1:
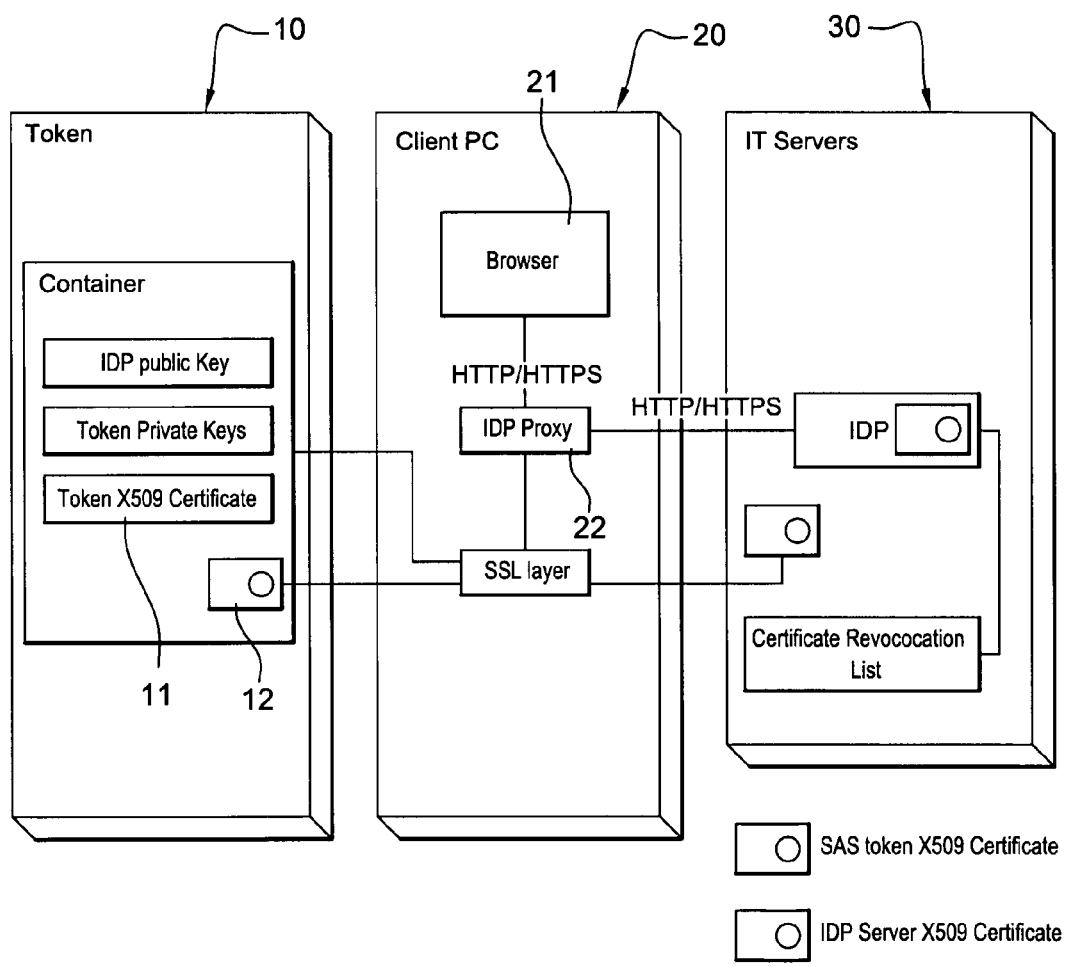
FIG. 1 depicts an architecture of an authenticating arrangement according to the invention.
Figure 2:
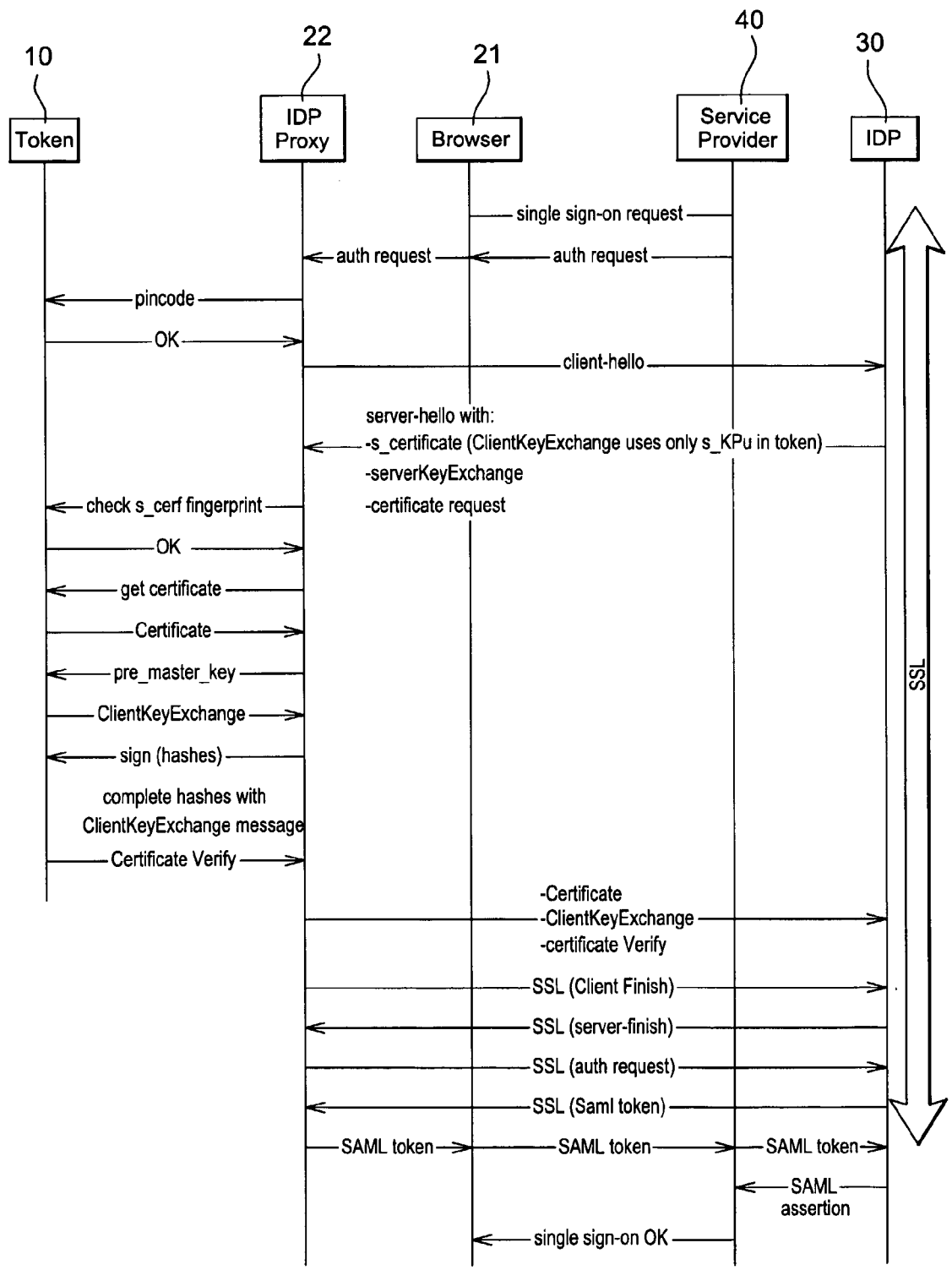
FIG. 2 depicts an authentication process according to the invention.

In the following example, a remote SSL server will be called IDP, thereby referring to IDentity Provider.

DETAILED DESCRIPTION OF THE INVENTION

This example relates to a SSL link which is used in order to authenticate a user using a smart card 10 on the internet via his PC (personal computer) 20. Any other kind of personal token, also called portable token, may replace such a smart card, like a USB token or a mass memory token including authenticating data.

Authentication with the smart card as an SSL client is performed as follows.

The PC of an end user typically embeds a web browser 21 which is triggered for accessing a remotely based web site via an IT server 40. A browser embedded in the smart card can equally be used for accessing the web site.

Such web site typically requires a login and the user or the smart card 10 typically selects the login link.

The PC 20 is presently equipped with a proxy 22 which is dedicated to IDP servers. Such proxy 22 is hereby called an IDP proxy.

In the present example, the client side SSL connection is not performed by the PC browser 21, but by the IDP proxy 22 using its own built-in but standard SSL layer.

By selecting the login link, the PC 20 and its browser 21 are therefore redirected to the IDP proxy 22 on the client PC.

Then the IDP proxy 22 opens an SSL connection with the IDP server 30. This SSL connection is secured by the card 10.

The SSL connection uses a card certificate 11. The SSL connection is successful if the card certificate 11 is a valid dongle certificate and is not in the Certificate Revocation List.

The IDP proxy 22 has a built-in implementation of SSL which is preferably independent from the known protocols MS-CAPI and PKCS#11. These known protocols use to pick the authenticating certificate 11 up from the card 10 and store it in the memory of the PC 20. The same remark can be done with the SSL built-in client of Internet Explorer or Netscape which uses to offer a strong authentication using the card certificate 11 as transferred into the PC 20.

By using such a different protocol, this prevents from storing the certificate in a registry or a file which is outside from the card 10, and a third-party thereby cannot perform strong authentication using the card through preliminary transfer of the certificate into the PC 20.

If the SSL connection is successful, the IDP server 30 looks-up the identity of the end-user from a dongle ID which is contained in the certificate 11, and the IDP server 30 then returns a SAML token to the IDP proxy 22.

The IDP proxy 22 then redirects the browser 21 to the service provider site with the SAML token.

From then on the browser 21 can access the protected site with the returned SAML token.

Before the SSL connection is rendered successful, an SSL authentication of the client is carried out as explained hereafter.

Thanks to the following arrangements, such SSL connection can exclusively be negotiated with the particular IDP server 30.

This exclusivity is ensured by using the public key of the IDP server 30 which has been stored in the card 10 at a previous step, for example at the personalization step of the smart card, during the manufacturing process, or even by Over-The-Air updating of the card memory. The server public key is presently stored in the server certificate 12 which is stored in the card in the same way as the card certificate 11.

As will be explained hereafter, storing the public key of the IDP server or any other server-specific information in the card 10 allows to prevent that any third-party servers may initiate a non agreed SSL connection with the smart card.

At the stage where an SSL connection is to be initiated between the IDP proxy 22 and IDP server 30, an SSL handshake occurs, during which the server certificate 12 from a server-hello message is used to check the server signature. This pertains to the standard SSL implementation.

To enforce server verification, the card 10 contains the server certificate 12 as a fingerprint or reliable authenticator element and the IDP Proxy requests the card to check the server certificate on the basis of the stored fingerprint 12.

Once the identity of the IDP server 30 is checked in the card 10, a ClientKeyExchange message is generated in the card.

As a preferred example, the IDP public key of the IDP server is stored in the card 10 and is used to generate the ClientKeyExchange message.

To this end, the card 10 completes a usual hash processing of the data with a signature process of the data on the basis of IDP dependant data, i.e. the public key of the server 30 in the present example.

A strong authentication specifically dedicated to the given IDP server 30 is thereby ensured by previous storage of the public key of the server in the card, and by performing the final phase of the SSL hash cryptography in the card with the prestored public key of the IDP server.

Such final phase which consists in performing a server specific signature is however preferably done before performing client signature (CertificateVerify message).

The signature of the ClientKeyExchange message with IDP dependent data provides two main advantages.

The SSL connection can only be rendered successful with the specific IDP server 30 which also contains such IDP server dependent data, as far as those data are necessary in the server 30 for interpreting the content of the ClientKeyExchange message.

The public key of the card can therefore not be used for any other purpose than performing an SSL connection with the specific IDP server.

When performing signature of the message, the card 10 implements a part of the SSL protocol dedicated to the wanted IDP server and related to server public key. It means that the card signature will be valid for the wanted server 30 but not for other servers that do not own the correct server private key. Such card 10 can therefore not be used in an unauthorized environment.

Alternatively, the used IDP dependent data may constitute either part of the message or an encrypting tool of the message which it is necessary to know for interpreting the message.

The public key of the server 30 is preferably the unique key that will transport SSL key materials to the server 30.

Practically, the IDP server upon reception of the card certificate 12 during the SSL connection verifies the validity of the certificate in the CRL (Certificate Revocation List), and performs an identity lookup from the card id contained in such certificate 12.

If the certificate 12 is valid, the SSL connection can be used to send back a SAML token to the IDP proxy as explained before and then the IDP proxy is redirecting the browser 21 to a service provider site, thereby inviting the PC browser 21 to connect to the service provider 40 with the SAML token.

The site of the service provider is asserting the validity of the SAML token with the IDP server 30 and if successful, the service provider is initiating an SSL connection without client certificate with the browser of the PC.

The service provider 40 can be hosted in the same IDP server 30 which was connected to the proxy 21 or can be hosted in another remote server.

Although the strong authentication can only be performed with the allowed SSL server, the authentication remains mainly a standard SSL authentication.

The server public key is preferably the key which is stored in the card 10, and not a key which may be transmitted by the server 30 during the SSL server-hello message, i.e. before initiation of the authentication process. This prevents third-party servers to initiate an SSL connection with the IDP proxy and to perform a strong authentication using the card.

Furthermore, due to the fact that in this particular example a standard SSL protocol is used which requires no heavy server-side custom of software or hardware, the SSL client implements the standard SSL protocol with client and server certificates, and is mainly supported on the shelf by most server software and hardware components.

The description has been made with reference to a smart card. However the invention relates also to other type of portable tokens for personal authentication, such a USB sticks or mass memory cards.

The invention claimed is:

1. An assembly comprising:
a personal token and a telecommunication terminal (20) which hosts said personal token (10),
said telecommunication terminal comprising a proxy program which establishes SSL connections to an authentication server on behalf of other programs and to which SSL connection requests from other programs executing on the telecommunication terminal are redirected and including instructions:
to request said personal token (10) to verify a remote authentication server (30);
a built-in SSL implementation to establish an SSL communications channel using a certificate from the personal token without storing the certificate in the telecommunications terminal;
to use the built-in SSL implementation to establish an SSL communications channel to the remote authentication server upon successful verification of the remote server by the personal token;
to receive a SAML token from the remote authentication server; and
to transfer the SAML token to a said other program from which an SSL connection request originated thereby allowing said other program to establish an SSL connection to a remote service provider server;
the personal token comprises a processor and storage including:
data which is specifically associated with the remote server;
instructions to operate the processor of the personal token to receive a server verification request from the proxy program, in response to receiving the server verification request verifying that the server corresponds to an authorized server, in response to successfully verifying the remote server, initiating an SSL connection according to the non-standard SSL protocol by generating a message authenticating said personal token to the remote server and by signing said message with said data so that only the specific remote server can interpret the authenticating message.

2. The assembly according to claim 1, wherein the data, which is specifically associated with the server, is a public key of the server.

3. A method for authentication in a network using a personal token, said method comprising the following steps:
a) providing a personal token which embeds a piece of software for initiating an SSL connection including generating a message which authenticates said token to a remote authentication server,
b) providing a telecommunication terminal comprising a proxy program which establishes SSL connections to an authentication server on behalf of other programs and including instructions to request said personal token to verify the remote authentication server, c) redirecting control to the proxy program upon user attempt to initiate an SSL session with a remote service provider server in another program on the telecommunication terminal, d) operating the telecommunication terminal according to the instructions of the proxy program to initiate an SSL session with the remote authentication server and to receive a server certificate from the remote authentication server;

e) operating the telecommunication terminal according to the instructions of the proxy program to request, from the personal token, a server verification request based on the received server certificate, f) receive on the personal token the server verification request from the proxy, and in response to successfully verifying the server, generating by said piece of software a message authenticating said token to the remote server, using data which is pre-stored in the token and which is specifically associated with the remote server using a function whereby said message can be interpreted only by the specific remote server, g) receive on the telecommunications terminal, operating according to instructions of the proxy program, a certificate of the personal token and transmit the certificate of the personal token to the remote authentication server, h) operating the telecommunications terminal according to instructions of the proxy program to receive a SAML token from the remote authentication server, and i) redirecting the SAML token to the another program that attempted to initiate an SSL session with a remote service provider server thereby allowing the another program to communicate with the remote service provider using SSL.

4. A method for restricting the use of a personal token connected to a host computer to authenticate a user and to establish an authenticated session with an IT server operating a browser on the host computer to a remote authentication server, the method restricting the use of the personal token to authorized remote authentication servers, the method comprising:

receiving a server logon request from a user to logon to the IT server in a first program executing on the host computer;

redirecting the server logon to a proxy program also executing on the host computer for connection to a remote authorization server;

operating the host computer according to the instructions of the proxy program to initiate an SSL session with the remote authentication server and to receive a server certificate from the remote authentication server;

operating the host computer according to instructions of the proxy program to request the personal token to verify that the remote authorization server is an authorized server based on the received server certificate;

operating the personal token:
  to receive the request to verify the remote authorization server and verify the remote authorization server as an authorized server;
  upon verification of the remote server as an authorized server, to use data stored on the personal token and associated uniquely with the remote server to generate a message only interpretable by the remote authorization server in a non-standard protocol;

operating the host computer operating according to instructions of the proxy program:
  receive a certificate of the personal token and transmit the certificate of the personal token to the remote authentication server,
  to receive a SAML token from the remote authorization server; and
  to transfer the SAML token to the browser; and operating the host computer operating according to instructions of the browser to
  upon receiving the SAML token from the proxy program to initialize a secure session with the IT server.

* * * * *